(12) United States Patent
Bachon et al.

(10) Patent No.: US 8,003,745 B2
(45) Date of Patent: Aug. 23, 2011

(54) ALPHA-ETHOXYSILANE MODIFIED POLYMERS, THEIR PREPARATION AND USE

(75) Inventors: Thomas Bachon, Duesseldorf (DE); Jennifer Schmidt, Langenfeld (DE); Thomas Tamcke, Haus-Endt-Str. (DE); Patrick Gawlik, Langenfeld (DE)

(73) Assignee: Henkel AG & Co. KGaA, Dusseldorf (DE)

( * ) Notice: Subject to any disclaimer, the term of this patent is extended or adjusted under 35 U.S.C. 154(b) by 501 days.

(21) Appl. No.: 12/105,487

(22) Filed: Apr. 18, 2008

(65) Prior Publication Data

US 2008/0269406 A1 Oct. 30, 2008

Related U.S. Application Data

(63) Continuation of application No. PCT/EP2006/010082, filed on Oct. 19, 2006.

(30) Foreign Application Priority Data

Oct. 29, 2005 (DE) .......................... 10 2005 051 921

(51) Int. Cl.
*C08G 77/06* (2006.01)
*C08G 77/60* (2006.01)

(52) U.S. Cl. ................ 528/28; 528/18; 528/34; 528/35; 528/38

(58) Field of Classification Search .................. None
See application file for complete search history.

(56) References Cited

U.S. PATENT DOCUMENTS

| 4,562,237 | A | 12/1985 | Okuno et al. |
| 5,068,304 | A | 11/1991 | Higuchi et al. |
| 5,358,996 | A * | 10/1994 | Takago et al. ................. 524/588 |
| 6,884,852 | B1 | 4/2005 | Klauck et al. |
| 7,009,022 | B2 | 3/2006 | Doch et al. |
| 7,057,001 | B2 | 6/2006 | Bachon et al. |
| 7,153,923 | B2 * | 12/2006 | Schindler et al. ................. 528/35 |
| 7,294,665 | B1 | 11/2007 | Lim |
| 7,307,134 | B2 * | 12/2007 | Lim et al. ........................ 528/34 |
| 7,357,960 | B2 | 4/2008 | Stanjek et al. |
| 2005/0271885 | A1 | 12/2005 | Stanjek et al. |
| 2006/0111505 | A1 | 5/2006 | Schindler et al. |
| 2006/0128919 | A1 * | 6/2006 | Okamoto et al. ................. 528/25 |
| 2006/0199933 | A1 * | 9/2006 | Okamoto et al. ................. 528/29 |
| 2008/0160200 | A1 | 7/2008 | Stanjek et al. |

FOREIGN PATENT DOCUMENTS

| DE | 197 27 029 | | 6/1997 |
| DE | 102 37 271 | | 8/2002 |
| DE | 10237270 | A1 | 3/2004 |
| WO | WO 99/48942 | | 9/1999 |
| WO | WO 02/068501 | | 9/2002 |
| WO | WO 03/018658 | * | 3/2003 |
| WO | WO 2004/022625 | | 3/2004 |
| WO | WO 2004/039892 | * | 5/2004 |
| WO | WO 2005/019345 | * | 3/2005 |

OTHER PUBLICATIONS

International Search Report.

* cited by examiner

*Primary Examiner* — Marc S Zimmer
(74) *Attorney, Agent, or Firm* — James E. Plotrowski; Steven C. Bauman

(57) ABSTRACT

The invention relates to α-ethoxysilane modified polymers of the average general formula (I):

$$R \left[ \begin{array}{c} O \\ \parallel \\ C \end{array} - \overset{H}{N} - CH_2 - \overset{R^1}{\underset{R^3}{Si}} - R^2 \right]_n \quad (I)$$

in which
R is a mono- to tetravalent polymer radical, not more than a third of the radicals $R^1$, $R^2$, and $R^3$ present in the polymer of the formula (I), independently of one another, are alkyl radicals having 1 to 4 carbon atoms, at least a quarter of the radicals $R^1$, $R^2$, and $R^3$ present in the polymer of the formula (I), independently of one another, are ethoxy radicals, any remaining radicals $R^1$, $R^2$, and $R^3$, independently of one another, are methoxy radicals, and in which n is 1 to 4. The invention further relates to a process for preparing the polymers of the formula (I), and also to their use in adhesives, sealants, and coating materials.

4 Claims, No Drawings

ALPHA-ETHOXYSILANE MODIFIED POLYMERS, THEIR PREPARATION AND USE

CROSS-REFERENCE TO RELATED APPLICATIONS

This application is a continuation under 35 USC Sections 365(c) and 120 of International Application No. PCT/EP2006/010082, filed 19 Oct. 2006 and published 3 May 2007 as WO 2007/048538, which claims priority from German Application No. 102005051921.0, filed 29 Oct. 2005, each of which is incorporated herein by reference in its entirety.

FIELD OF THE INVENTION

The present invention relates to silane-modified polymers, more particularly α-ethoxysilane modified polymers, to their preparation, and to their use in adhesives and sealants, and also coating materials.

DISCUSSION OF THE RELATED ART

Silane-crosslinking adhesives and sealants comprise alkoxysilane-terminated polymers as binders. Polymer systems which possess reactive alkoxysilyl groups have long been familiar. In the presence of atmospheric moisture, these alkoxysilane-terminated polymers are capable even at room temperature of undergoing condensation with one another, with elimination of the alkoxy groups in the process. Depending on the level of alkoxysilane groups and on their structure, the products are primarily long-chain polymers (thermoplastics), relatively wide-meshed three-dimensional networks (elastomers), or else highly crosslinked systems (thermosets).

The polymers generally have an organic backbone which carries alkoxysilane groups at the ends. The organic backbone may comprise, for example, polyurethanes, polyesters, polyethers, etc.

DE 197 27 029 A1 discloses a one-component reactive-system composition which comprises an alkoxysilane-terminated polyurethane, a curing catalyst, and, if desired, typical additives.

WO 99/48942 A1 discloses alkoxysilane-terminated polyurethanes and corresponding polyurethane preparations which besides the alkoxysilylated polyurethanes, can comprise solvents, catalysts, plasticizers, reactive diluents, fillers, and the like.

WO 02/068501 describes the preparation of mixedly alkoxysilylated polymers based on γ-silanes, using tin catalysts.

The polymers that contain alkoxysilane end groups and are used in practice in the prior art generally contain methoxysilane end groups. These binders are frequently used as substituents for NCO-terminated polyurethanes and on account of the absence of isocyanate have distinct toxicological advantages for the user. A disadvantage, however, is the elimination of small amounts of methanol in the course of curing.

The presently typical silane-terminated polymers generally contain dimethoxymethyl-γ-silyl or trimethoxy-γ-silyl end groups. Replacing the methoxy groups by ethoxy groups reduces the reactivity of the polymers to an extent such that the cure rate of the adhesives is no longer acceptable.

BRIEF SUMMARY OF THE INVENTION

It is an object of the present invention to provide silane-crosslinking polymers which release less methanol in curing and which, furthermore, allow an acceptable cure rate in the adhesives and sealants that can be produced from them. Surprisingly it has been found that the aforementioned object can be achieved by the provision of silane-modified polymers of the general formula (Ia):

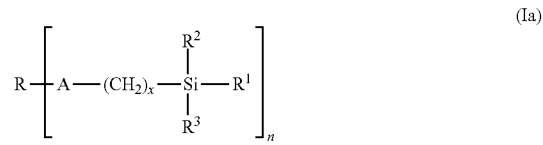

in which
R is a mono- to tetravalent polymer radical,
$R^1$, $R^2$, and $R^3$ independently of one another are each an alkyl or alkoxy radical having 1 to 8 C atoms, and
A is a carboxyl, carbamate, amide, carbonate, ureido, urethane or sulfonate group or an oxygen atom,
x is 1 to 8, and
n is 1 to 4.

Preferably $R^1$, $R^2$, and $R^3$ here independently of one another are alkyl or alkoxy radicals having 1 to 5 C atoms, more preferably methyl, ethyl, propyl and/or butyl as alkyl radicals and methoxy, ethoxy and/or propoxy as alkoxy radicals. With particular preference $R^1$, $R^2$, and $R^3$ are a combination of methoxy, ethoxy and/or methyl, ethyl, propyl, isopropyl, n-butyl or isobutyl, more preferably methoxy or ethoxy and/or methyl or ethyl.

x is preferably 1 or 2, with more preference 1.
n is preferably 2 or 3, with more preference 2.

DETAILED DESCRIPTION OF CERTAIN EMBODIMENTS OF THE INVENTION

A "carbamate group" for the purposes of the present invention is a structural element of the general formula (II)

where the bond of the carbamate group to R may be either via the nitrogen or via the oxygen.

An "amide group" for the purposes of the present invention is a structural element of the general formula (III)

where the bond of the amide group to R may be either via the nitrogen or via the carbon.

In one preferred embodiment not more than a third of the radicals $R^1$, $R^2$, and $R^3$ present in the polymer of the formula (Ia), independently of one another, are alkyl radicals having 1 to 4 carbon atoms, at least a quarter of the radicals $R^1$, $R^2$, and $R^3$ present in the polymer of the formula (Ia), independently of one another, are ethoxy radicals, and any remaining radicals $R^1$, $R^2$, and $R^3$, independently of one another, are methoxy radicals. Consequently, when n>1, in some of the n [CO—NH—CH$_2$—SiR$^1$R$^2$R$^3$] radicals within the polymer (Ia) of the invention, there may be different proportions of alkyl:ethoxy:methoxy of the radicals $R^1$, $R^2$, and $R^3$, provided that the above conditions for the overall formula (Ia) are met by the other [CO—NH—CH$_2$—SiR$^1$R$^2$R$^3$] radicals.

Further, it has been surprisingly found that the aforementioned object can be achieved through the provision of α-ethoxysilane modified polymers of the average general formula (Ib):

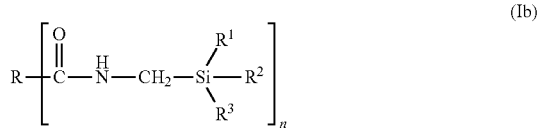
(Ib)

in which
R is a mono- to tetravalent polymer radical,
not more than a third of the radicals R$^1$, R$^2$, and R$^3$ present, in the polymer of the formula (Ib), independently of one another, are alkyl radicals having 1 to 4 carbon atoms,
at least a quarter of the radicals R$^1$, R$^2$, and R$^3$ present in the polymer of the formula (Ib), independently of one another, are ethoxy radicals,
any remaining radicals R$^1$, R$^2$, and R$^3$ independently of one another are methoxy radicals, and in which n is 1 to 4.

Consequently, when n>1, in some of the n [CO—NH—CH$_2$—SiR$^1$R$^2$R$^3$] radicals within the polymer (Ib) of the invention, there may be different proportions of alkyl:ethoxy:methoxy of the radicals R$^1$, R$^2$, and R$^3$, provided that the above conditions for the overall average formula are met by the other [CO—NH—CH$_2$—SiR$^1$R$^2$R$^3$] radicals.

Thus, besides dimethoxyethoxy, methoxydiethoxy, or methyldiethoxy radicals, for example, there may also be trimethoxy, and dimethylethoxy radicals or similar SiR$^1$R$^2$R$^3$ groups present in the overall molecule when the necessary number of ethoxy groups of at least a quarter, based on the overall molecule, is achieved and not more than a third of the radicals R$^1$, R$^2$, and R$^3$ ere straight-chain or branched alkyl radicals having 1 to 4 carbon atoms.

In contrast to the α-silyl-crosslinking polymers known from the prior art, the polymers of the invention possess a lower level of methanol elimination during condensation, owing to at least partial replacement of the methoxy groups by ethoxy groups. And yet, owing to the α-silyl groups, the reactivity is sufficiently high for good cure rates to be achieved.

The present invention accordingly provides α-ethoxysilane modified polymers of the general formula (Ib):

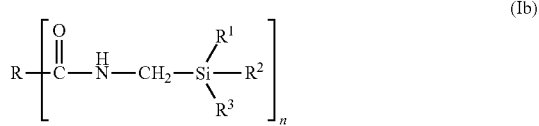
(Ib)

in which
R is a mono- to tetravalent polymer radical,
not more than a third of the radicals R$^1$, R$^2$, and R$^3$ present in the polymer of the formula (Ib), independently of one another, are alkyl radicals having 1 to 4 carbon atoms,
at least a quarter of the radicals R$^1$, R$^2$, and R$^3$ present in the polymer of the formula (Ib), independently of one another, are ethoxy radicals,
any remaining radicals R$^1$, R$^2$, and R$^3$ independently of one another are methoxy radicals, and in which n is 1 to 4.

In this case, more particularly where n>1, in some of the n [CO—NH—CH$_2$—SiR$^1$R$^2$R$^3$] radicals within the polymer (Ib) of the invention, there may be different proportions of alkyl:ethoxy:methoxy of the radicals R$^1$, R$^2$, and R$^3$, provided that the above conditions for the overall formula (Ib) are met by the other [CO—NH—CH$_2$—SiR$^1$R$^2$R$^3$] radicals.

The mono- to tetravalent polymer radicals R are preferably hydrocarbon radicals, which may contain heteroatoms and/or organosiloxane groups, or are organosiloxane radicals themselves. Examples of such radicals are alkyd resins, oil-modified alkyd resins, unsaturated polyesters, natural oils, such as linseed oil, tung oil or soybean oil, for example, and also epoxides, polyamides, thermoplastic polyesters, such as polyethylene terephthalate and polybutylene terephthalate, for example, polycarbonates, polyethylenes, polybutylenes, polystyrenes, polypropylenes, ethylene-propylene copolymers and terpolymers, acrylates, such as homopolymers and copolymers of acrylic acid, acrylates, methacrylic acid, methacrylates, acrylamides, their salts, and the like, for example, phenolic resins, polyoxymethylene homopolymers and copolymers, polyurethanes, polysulfones, polysulfide rubbers, nitrocellulose, vinyl butyrates, vinyl polymers, such as polymers containing vinyl chloride and/or vinyl acetate, for example, ethylcellulose, cellulose acetates and cellulose butyrates, rayon, shellac, waxes, ethylene copolymers, such as ethylene-vinyl acetate copolymers, ethylene-acrylic acid copolymers, ethylene-acrylate copolymers, for example, organic rubbers, silicone resins, and the like. Further examples include polyethers, such as polyethylene oxide, polypropylene oxide, and polytetrahydrofuran. Among the polymeric radicals stated, particular preference is given to polyethers, polyesters, and polyurethanes. Especially preferred polymers from which the radical R is derived are, for example, polyalkylene glycols, such as polypropylene glycol with terminal hydroxyl groups. Polymers of this kind are available, for example, under the trade name Acclaim® polyols from the company Bayer MaterialScience. The polymer radicals preferably possess one to four terminal isocyanate-reactive groups.

The number-average molar mass $M_n$ of the polymer radicals is situated preferably in the range from 8000 to 50000, more preferably 10000 to 30000, and very preferably 12000 to 20000 daltons.

The radicals R are preferably divalent or trivalent radicals, the divalent radicals being particularly preferred.

In one preferred embodiment at least a third, more preferably at least two thirds, of the radicals R$^1$, R$^2$ or R$^3$ present in the compounds of the general formula (Ia) or (Ib) are ethoxy radicals.

The compounds of the general formula (Ia) or (Ib) preferably contain less than 1 part, more preferably less than 0.75 part, very preferably less than 0.5 part, such as, for example, less than 0.25 part, by weight of methoxy radicals, based on 100 parts by weight of the compounds of the formula (Ia) or (Ib).

The present invention further provides curable compositions which comprise the silane-modified polymers of the general formula (Ia) according to the invention.

The present invention further provides curable compositions which comprise the α-ethoxysilane modified polymers of the average general formula (Ib) according to the invention.

These curable compositions of the invention preferably further comprise fillers and other typical adjuvants such as plasticizers, solvents, UV stabilizers, antioxidants, catalysts, dryers, rheological assistants, ageing inhibitors, thickeners, reactive diluents, and adhesion promoters.

Suitable fillers are, for example, chalk or finely ground lime, precipitated and/or fumed silica, zeolites, bentonites, ground minerals, calcium carbonate, quartz dust, precipitated silicon dioxide, silicic anhydride, silicon hydrate or carbon black, magnesium carbonate, fired clay, clay, talc, titanium oxide, iron oxide, zinc oxide, cellulose, wood flour, mica, chaff, graphite, fine aluminum powder, or flint powder, glass beads, finely ground glass, glass fibers, including short-cut glass fibers, and other inorganic fillers familiar to the skilled worker. In addition it is also possible to use organic fillers, more particularly short-cut fibers or hollow plastic beads, and also functional fillers that benefit the rheological properties, examples being highly disperse silica, more particularly that having a low BET surface area of 20-150 m$^2$/g, preferably 30-100 m$^2$/g, with more particular preference about 50 m$^2$/g, and the like. Certain applications prefer fillers which impart thixotropy to adhesives or sealants, examples being swellable plastics such as polyvinyl chloride.

The curable compositions of the invention may contain up to about 80% by weight of fillers.

The α-silanes that are preferred as adhesion promoters, dryers and/or reactive diluents are advantageously selectable from the group consisting of α-aminosilanes, α-methacryloylsilanes, α-carbamatosilanes, and α-alkoxysilanes. Suitable examples are N-cyclohexylaminomethylmethyldiethoxysilane, N-cyclohexylaminomethyltriethoxysilane, N-phenylaminomethyltriethoxysilane, (methacryloyloxymethyl)methyldiethoxysilane and methacryloyloxymethyltriethoxysilane, and N-(triethoxysilylmethyl)-O-methylcarbamate and N-(methyldiethoxysilylmethyl)-O-methylcarbamate.

In the case of the reactive diluents, however, preference is given to polyurethanes having at least one alkoxysilane group as reactive group.

The reactive diluents may contain one or more functional groups, though the number of functional groups is preferably 1 to about 6, more particularly about 2 to about 4, about 3 for example.

In one preferred embodiment the viscosity of the reactive diluents is less than about 20 000 mPas, more particularly about 1000 to about 10 000, and, for example, about 3000 to about 6000 mPas (Brookfield RVT, 23° C., spindle 7, 2.5 rpm).

The reactive diluents which can be used may have any desired molecular weight distribution (PD), and are preparable, accordingly, by the typical methods of polymer chemistry.

As reactive diluents it is preferred to use polyurethanes which can be prepared from a polyol component and an isocyanate component with subsequent functionalization with one or more alkoxysilyl groups.

In the context of the present text the term "polyol component" encompasses a single polyol or a mixture of two or more polyols which can be used to prepare polyurethanes. A polyol is a polyfunctional alcohol, i.e., a compound having more than one OH group in the molecule.

As the polyol component for preparing the reactive diluents it is possible to use a multiplicity of polyols. These are, for example, aliphatic alcohols having 2 to 4 OH groups per molecule. The OH groups may be both primary and secondary. The suitable aliphatic alcohols include, for example, ethylene glycol, propylene glycol, and polyfunctional alcohols of this kind.

Likewise suitable for use as polyol components are polyethers which have been modified by vinyl polymers. Products of this kind are obtainable, for example, by polymerizing styrene and/or acrylonitrile in the presence of polyethers.

Likewise suitable as a polyol component for the preparation of the reactive diluent are polyester polyols having a molecular weight of about 200 to about 5000. Thus, for example, it is possible to use polyester polyols which are formed by the above-described reaction of low molecular mass alcohols, more particularly of ethylene glycol, diethylene glycol, neopentyl glycol, hexanediol, butanediol, propylene glycol, glycerol or trimethylolpropane, with caprolactone. Likewise suitable as polyfunctional alcohols for preparing polyester polyols, as already stated, are 1,4-hydroxy-methylcyclohexane, 2-methyl-1,3-propanediol, butane-1,2,4-triol, triethylene glycol, tetraethylene glycol, polyethylene glycol, dipropylene glycol, polypropylene glycol, dibutylene glycol, and polybutylene glycol.

Further suitable polyester polyols can be prepared by polycondensation. For instance, difunctional and/or trifunctional alcohols can be condensed with a substoichiometric amount of dicarboxylic acids and/or tricarboxylic acids, or their reactive derivatives, to give polyester polyols.

Polyols used with particular preference as a polyol component for preparing the reactive diluents in the context of the present invention are, for example, dipropylene glycol and/or polypropylene glycol having a molecular weight of about 400 to about 2500, and also polyester polyols, preferably polyester polyols obtainable by polycondensation of hexanediol, ethylene glycol, diethylene glycol or neopentyl glycol or mixtures of two or more thereof and isophthalic acid or adipic acid, or their mixtures.

Likewise suitable as a polyol component for preparing the reactive diluents are polyacetals. Polyacetals are compounds of the kind obtainable from glycols, diethylene glycol or hexanediol for example, with formaldehyde. Polyacetals which can be used for the purposes of the invention may likewise be obtained by the polymerization of cyclic acetals.

Additionally suitable as polyols for preparing the reactive diluents are polycarbonates. Polycarbonates can be obtained, for example, through the reaction of diols such as propylene glycol, butane-1,4-diol or hexane-1,6-diol, diethylene glycol, triethylene glycol or tetraethylene glycol, or mixtures of two or more thereof, with diaryl carbonates, diphenyl carbonate for example, or phosgene.

Likewise suitable as a polyol component for preparing the reactive diluents are polyacrylates which carry OH groups. These polyacrylates are obtainable, for example, through the polymerization of ethylenically unsaturated monomers which carry an OH group. Monomers of that kind are obtainable, for example, through the esterification of ethylenically unsaturated carboxylic acids and difunctional alcohols, the alcohol generally being present in a slight excess. Examples of ethylenically unsaturated carboxylic acids suitable for this purpose include acrylic acid, methacrylic acid, crotonic acid or maleic acid. Examples of corresponding esters which carry OH groups include 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate, or mixtures of two or more thereof.

For the preparation of the inventively preferred reactive diluents the corresponding polyol component is reacted in each case with an at least difunctional isocyanate. An at least difunctional isocyanate is suitably, in principle, any isocyanate having at least two isocyanate groups; generally, however, for the purposes of the present invention, preference is given to compounds having two to four isocyanate groups, more particularly having two isocyanate groups.

The compound present as a reactive diluent in the context of the present invention preferably contains at least one alkoxysilane group; among the alkoxysilane groups, the dialkoxysilane and trialkoxysilane groups are preferred.

To reduce the viscosity of the compositions of the invention it is also possible to use a plasticizer in addition to or instead of a reactive diluent.

Examples of suitable plasticizers include esters such as abietic esters, adipic esters, azelaic esters, benzoic esters, butyric esters, acetic esters, esters of higher fatty acids having about 8 to about 44 C atoms, such as dioctyl adipate, diisodecyl succinate, dibutyl sebacate or butyl oleate, esters of OH-carrying or epoxidized fatty acids, fatty acid esters, and fats, glycolic esters, phosphoric esters, phthalic esters, of linear or branched alcohols containing 1 to 12 C atoms, such as, for example, dioctyl phthalate, dibutyl phthalate or butyl benzyl phthalate, propionic esters, sebacic esters, sulfonic esters, thiobutyric esters, trimellitic esters, citric esters, and nitrocellulose-based and polyvinyl acetate-based esters, and also mixtures of two or more thereof. Particularly suitable are the asymmetric esters of difunctional, aliphatic dicarboxylic acids, an example being the product of esterification of monooctyl adipate with 2-ethylhexanol (EDENOL DOA, Cognis, Düsseldorf).

Likewise suitable as plasticizers are the pure or mixed ethers of monofunctional, linear or branched C4-16 alcohols or mixtures of two or more different ethers of such alcohols, an example being dioctyl ether (available as CETIOL OE, Cognis, Düsseldorf).

In a further preferred embodiment, plasticizers used include endgroup-capped polyethylene glycols. Examples are polyethylene or polypropylene glycol di-$C_{1-4}$ alkyl ethers, more particularly the dimethyl or diethyl ethers of diethylene glycol or dipropylene glycol, and also mixtures of two or more thereof.

Likewise suitable as plasticizers for the purposes of the present invention are diurethanes. Diurethanes can be prepared, for example, by reacting diols having OH end groups with monofunctional isocyanates, by choosing the stoichiometry such that substantially all of the free OH groups are consumed by reaction. Any excess isocyanate can be removed subsequently, for example, by distillation from the reaction mixture. A further method of preparing diurethanes consists in reacting monofunctional alcohols with diisocyanates, with all of the NCO groups, as far as possible, being consumed by reaction.

To prepare the diurethanes on the basis of diols it is possible to use diols having 2 to about 22 C atoms, examples being ethylene glycol, propylene glycol, 1,2-propanediol, dibutanediol, hexanediol, octanediol or technical mixtures of hydroxy-fatty alcohols having about 14 C atoms, more particularly hydroxystearyl alcohol. Preference is given to linear diol mixtures, more particularly those which include polypropylene glycol having an average molecular weight (Mn) of about 1000 to about 6000 in amounts above about 50% by weight, more particularly above about 70% by weight. Very particular preference is given to diurethanes exclusively based on propylene glycol with identical or different average molecular weights of about 1000 to about 4000. The free OH groups of the diol mixtures are substantially all consumed by reaction with aromatic or aliphatic monoisocyanates or mixtures thereof Preferred monoisocyanates are phenyl isocyanate or tolylene isocyanate or mixtures thereof.

To prepare the diurethanes on the basis of diisocyanates, aromatic or aliphatic diisocyanates or their mixtures are used. Suitable aromatic or aliphatic diisocyanates are, for example, the isocyanates of the kind indicated above as being suitable for the preparation of the polyurethane of the invention, preferably tolylene diisocyanate (TDI). The free NCO groups of the diisocyanates are reacted substantially completely with monofunctional alcohols, preferably linear monofunctional alcohols or mixtures of two or more different monofunctional alcohols. Particularly suitable are mixtures of linear monofunctional alcohols. Examples of suitable monoalcohols are monoalcohols having 1 to about 24 C atoms, examples being methanol, ethanol, the positional isomers of propanol, butanol, pentanol, hexanol, heptanol, octanol, decanol or dodecanol, more particularly the respective 1-hydroxy compounds, and also mixtures of two or more thereof. Likewise suitable are so-called technical mixtures of alcohols and endgroup-capped polyalkylene glycol ethers. Particularly suitable are alcohol mixtures which include polypropylene glycol monoalkyl ethers having an average molecular weight (Mn) of about 200 to about 2000 in an amount of more than about 50% by weight, preferably more than about 70% by weight, based on the alcohol mixture. Particular preference is given to diurethanes based on diisocyanates whose free NCO groups have been fully reacted by means of polypropylene glycol monoalkyl ethers having an average molecular weight of about 500 to about 2000.

Besides reactive diluents and plasticizers it is also possible for the curable compositions of the invention to comprise further adjuvants, which serve generally to modify certain physical properties of the composition before or after processing, or to promote the stability of the composition before or after processing.

Frequently it is sensible to stabilize the compositions of the invention with respect to moisture penetration, in order to increase the storage properties (shelf life). An improvement in shelf life of this kind can be achieved, for example, through the use of stabilizers. Suitable stabilizers include all compounds which react with water to form a group which is inert toward the reactive groups present in the composition, and which, in the process, undergo changes as small as possible in their molecular weight.

Examples of suitable stabilizers include, preferably, isocyanates or silanes. Suitable silanes are, for example, (methoxycarbonylamino)methyltrimethoxysilanes, vinyl silanes such as 3-vinylpropyltriethoxysilane, vinyltrimethoxysilane, oximosilanes such as methyl-O,O',O''-butan-2-one-trioximosilane or O,O',O''O'''-butan-2-one-tetraoximosilane (CAS nos. 022984-54-9 and 034206-40-1) or benzamidosilanes such as bli(N-methylbenzamido)methylethoxysilane (CAS no. 16230-35-6).

The curable compositions of the invention generally contain about 0% to about 6% by weight of stabilizers.

The curable compositions of the invention may further comprise up to about 7% by weight, more particularly about 3% to about 5% by weight, of antioxidants.

The antioxidants or stabilizers which can be used as adjuvants for the purposes of the invention include hindered phenols of high molecular weight ($M_w$), polyfunctional phenols, and phenols containing sulfur and containing phosphorus. Examples of phenols which can be used as adjuvants for the purposes of the invention include 1,3,5-trimethyl-2,4,6-tris (3,5-di-tert-butyl-4-hydroxybenzyl)benzene; pentaerythritol tetrakis-3-(3,5-di-tert-butyl-4-hydroxyphenyl)propionate; n-octadecyl (3,5-di-tert-butyl-4-hydroxyphenyl)propionate; 4,4-methylenebis(2,6-di-tert-butyl -phenol); 4,4-thiobis(6-tert-butyl-o-cresol); 2,6-di-tert-butylphenol; 2,4-dimethyl-6-tert-butylphenol, 2,2'-methylenebis(4-methyl-6-tert-butylphenol); 4,4'-butylidenebis(3-methyl-6-tert-butylphenol); 4,4'-thiobis(3-methyl-6-tert-butylphenol); 2,6-di -tert-butyl-p-cresol; 6-(4-hydroxyphenoxy)-2,4-bis(n-octylthio)-1,3,5- triazine; tetrakis[methylene-3-(3,5-di-tert-butyl-4-hydroxyphenyl)propionate]methane; 1,1,3-tris(2-methyl-4-hydroxy-4-tert-butyl-phenyl)butane; di-n-octadecyl 3,5-di-tert-butyl-4-hydroxybenzylphosphonate; 2-(n-octylthio)ethyl 3,5-di-tert-butyl-4-hydroxybenzoate; and sorbitol hexa[3-(3,5-di-tert-butyl-4-hydroxyphenyl)propionate]. Examples of suitable photostabilizers are those available commercially under the name Tinuvin® (manufacturer: Ciba Geigy).

Suitable catalysts for promoting crosslinking include, in particular, aliphatic monoamines, diamines, polyamines, and also heterocyclic amines and aromatic amines, examples being butylamine, hexylamine, octylamine, decylamine or laurylamine, ethylenediamine, hexanediamine, dibutylamine, triethanolamine, triethylenediamine, trimethylaminoethylpiperazine, pentamethyldiethylenetriamine, tetramethyliminodiisopropylamine, and bis(dimethylaminopropyl)-N-isopropanolamine, and also dimorpholinodiethyl ether, diethylenetriamine, cyclohexylamine, benzylamine, diethylaminopropylamine, xylylenediamine, guanidine, diphenylguanidine, triethylenetetramine or tetraethylenepentamine, piperidine or piperazine, metaphenylenediamine, 2,4,6-tris(dimethylaminomethyl)phenol, morpholine, N-methylmorpholine, 1,3-diazabicyclo[5.4.0]undec-7-ene (DBU). Further suitable catalysts are those based on organic or inorganic heavy metal compounds, such as, for example, cobalt naphthenate, dibutyltin dilaurate, tin mercaptides, tin dichloride, zirconium tetraoctoate, tin naphthenate, tin stearate, antimony dioctcate, lead dioctoate, metal acetylacetonate, more particularly iron acetylacetonate. Suitable more particularly are all the catalysts known to accelerate silanol condensation. Examples of such include organotin, organotitanium, organozirconium or organoaluminum compounds. Examples of compounds of this kind are dibutyltin dilaurate, dibutyltin dimaleate, tin octoate, isopropyi triisostearoyl titanate, isopropyl tris(dioctyl-pyrophosphate) titanate, bis(dioctylpyrophosphate) oxyacetate titanate, tetrabutyl zirconate, tetrakis(acetylacetonato)zirconium, tetraisobutyl zirconate, butoxytris(acetylacetonato)zirconium, tris(ethylacetoacetato)aluminum. Dibutyltin alkyl esters such as dibutyltin alkylmaleates or dibutyltin laurates are particularly suitable, more particularly dibutyltin bisethylmaleate, dibutyltin bisbutylmaleate, dibulyltin bisoctylmaleate, dibutyltin bisoleylmaleate, dibutyltin bisacetylacetate, dibutyltin diacetate, dibutyltin dioctoate, dibutyltin oxide, dibutyltin bistriethoxysilicate, and their catalytically active derivatives. The stated catalysts can be used alone or as a mixture of two or more of the stated catalysts. Likewise suitable as catalysts are amino compounds which carry an alkoxysilyl group, an example being 3-aminopropyltrimethoxysilane. The preparation of the invention may contain up to 5% by weight of such catalysts in the total amount.

Further adjuvants which serve to vary certain properties cf the curable compositions may be present. Among them there may be, for example, colorants such as titanium dioxide. If desired it is possible for small amounts of thermoplastic polymers or copolymers to be present additionally in the curable compositions of the invention, examples being ethylene-vinyl acetate (EVA), ethylene-acrylic acid, ethylene-methacrylate, and ethylene-n-butyl acrylate copolymers, which where appropriate give the adhesive additional flexibility, toughness, and strength. It is likewise possible to add certain hydrophilic polymers, examples being polyvinyl alcohol, hydroxyethylcellulose, hydroxypropylcellulose, polyvinyl methyl ether, polyethylene oxide, polyvinylpyrrolidone, polyethyloxazolines or starch or cellulose esters. examples being the acetates having a degree of substitution of less than 2.5.

The curable compositions of the invention may contain up to about 2% by weight, preferably about 1% by weight, of UV stabilizers. Particularly suitable UV stabilizers are those known as hindered amine light stabilizers (HALS). For the purposes of the present invention it is preferred to use a UV stabilizer which carries a silane group and is incorporated into the end product in the course of crosslinking or curing. Particularly suitable for this purpose are the products LOWILITE 75 and LOWILITE 77 (Great Lakes, USA).

The curable compositions of the invention may comprise, for example, adjuvants which allow the adhesive properties to be modified. Examples of those suitable for this purpose include those known as tackifier resins, which can be divided into natural resins and synthetic resins. Examples of suitable tackifier resins are alkyd resins, epoxy resins, melamine resins, phenolic resins, urethane resins, and hydrocarbon resins, and also natural resins such as rosin, wood terpentine oil, and tall oil. Examples of suitable synthetic hydrocarbon resins are ketone resins, coumarone-indene resins, isocyanate resins, and terpene-phenolic resins. In the context of the present invention the use of synthetic resins is preferred.

The curable compositions of the invention may further comprise flame retardants, such as, for example, typical phosphorus compounds, more particularly elemental phosphorus, phosphates or phosphonates, examples being triethyl phosphate or trichloropropyl phosphate. Compounds of this kind may at the same time have plasticizing and viscosity-regulating properties. Examples of further suitable flame retardants are diphenyl cresyl phosphates, triphenyl phosphate, dimethyl methanephosphonate, and the like. For flame retardancy it is additionally possible to use chlorinated paraffins. Likewise suitable are halogenated polyester polyols or polyether polyols, an example being commercially customary brominated polyether polyol.

The curable compositions of the invention, such as adhesives or sealants, for example, contain advantageously 5% to 90%, preferably 10% to 70%, and more preferably 15% to 50% by weight of the polymer of the general formula (Ia) or (Ib) according to the invention, based on the total weight of the curable compositions.

The invention further provides a process for preparing α-ethoxysilane modified polymers of the average general formula (Ib):

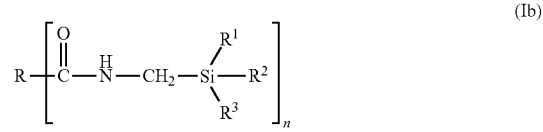

in which
R is a mono- to tetravalent polymer radical,
not more than s third of the radicals $R^1$, $R^2$, and $R^3$ present in the polymer of the formula (Ib), independently of one another, are alkyl radicals having 1 to 4 carbon atoms,
at least a quarter of the radicals $R^1$, $R^2$, and $R^3$ present in the polymer of the formula (Ib), independently of one another, are ethoxy radicals,
any remaining radicals $R^1$, $R^2$, and $R^3$ independently of one another are methoxy radicals, and
in which n is 1 to 4,
where a compound of the formula R—$X_m$, in which m is 1 to 4 and m=n and X is an isocyanate-reactive group, such as a hydroxyl or amino group, for example, is reacted with at least one compound of the formula OCN—$CH_2$—$SiR^4R^5R^6$ and at least one compound of the formula $SiR^7R^8R^9R^{10}$ in the presence of one or more catalysts, and where at least one of the radicals $R^4$, $R^5$, and $R^6$ is a methoxy radical and any further radicals $R^4$, $R^5$, and $R^6$ are alkyl radicals having 1 to 4 carbon atoms, and at least one of the radicals $R^7$, $R^8$, $R^9$ and $R^{10}$ is an ethoxy radical and any further radicals $R^7$, $R^8$, $R^9$ and $R^{10}$ are alkyl radicals having 1 to 4 carbon atoms.

The catalyst or catalysis employed here catalyze on the one hand the exchange of the alkoxy groups between the different silanes OCN—CH$_2$—SiR$^4$R$^5$R$^6$ and SiR$^7$R$^8$R$^9$R$^{10}$, and on the other hand the reaction of the isocyanate-reactive group with the isocyanatosilane compound. Examples of suitable catalysts include transition metal complexes such as, for example, titanium catalysts, more particularly organotitanium compounds, such as titanium tetraalkoxylates, for example, or, for example, tin compounds, more particularly organotin compounds, such as dialkyltin dicarboxylates, for example, or bases or acids.

As catalyst it is particularly preferred to use titanium compounds such as titanium tetraisopropylate, for example.

Preferably in the process of the invention first of all the compound $R$—$X_m$ is introduced as an initial charge with the catalyst and the compound of the formula $SiR^7R^8R^9R^{10}$, and then reaction with a compound of the formula OCN—CH$_2$—SiR$^4$R$^5$R$^6$ takes place in a temperature range of preferably 60 to 130° C. The monomeric compounds formed are then removed preferably by distillation.

Preferred groups X in the polymers of the general formula $R$—$X_m$ are hydroxyl groups, thiol groups, and amino groups.

Preferred compounds of the general formula OCN—CH$_2$—SiR$^4$R$^5$R$^6$ are alkyldimethoxysilanes and -trimethoxysilanes, such as (isocyanatomethyl)methyldimethoxysilane or (isocyanatomethyl)trimethoxysilane, for example.

Preferred compounds of the general formula $SiR^7R^8R^9R^{10}$ are alkyldiethoxysilanes and alkyltriethoxysilanes, such as methyltriethoxy-silane and ethyltriethoxysilane, for example, or tetraethoxysilane.

The invention provides, moreover, for the use of the silane-modified polymers of the invention for producing adhesives, more particularly reactive aftercrosslinking pressure-sensitive adhesives, and sealants, and also coating materials.

The invention provides, moreover, for the use of the α-ethoxysilane modified polymers of the invention, and those prepared in accordance with the invention, for producing adhesives, more particularly reactive aftercrosslinking pressure-sensitive adhesives, and sealants, and also coating materials.

The invention further provides for the use of the curable compositions of the invention for adhesively bonding wood, plastics, metals, mirrors, glass, ceramic, mineral substrates, leather, textiles, paper, cardboard, and rubber, it being possible for the materials in each case to be bonded to themselves or to any other of said materials.

The invention further provides for the use of the curable compositions of the invention as sealants. With advantage the compositions of the invention can also be used as surface-coating materials, as a water vapor barrier, as a plugging filler, hole filler or crack filler, and for producing moldings.

The invention is illustrated below with reference to working examples.

EXAMPLES

Example 1

450 g (24 mmol) of polypropylene glycol 18000 (hydroxyl number=6.1) are dried under reduced pressure at 80° C. in a 1000 ml three-neck flask. Under a nitrogen atmosphere and at 80° C., 0.1 g of titanium tetraisopropylate is added and then, after three minutes of stirring, 40 g of methyltriethoxysilane are added, and the mixture is stirred for a further 20 minutes. 0.1 g of dibutyltin dilaurate is added and then 9.1 g (54 mmol) of isocyanatomethyldimethoxymethylsilane (isocyanate content=25% by weight) are added. After stirring at 80° C. for one hour, volatile constituents (low molecular mass silanes) are distilled off under reduced pressure and the polymer formed is cooled. The product is stored in a moisture-tight glass vessel under a nitrogen atmosphere.

$^{13}$C NMR (CDCl$_3$/TMS): δ=−6.2 (—Si(CH$_3$)(OCH$_3$)$_2$); −5.7 (—Si(CH$_3$)(OCH$_2$CH$_3$)(OCH$_3$)); 27.2 (NH—CH$_2$—Si(CH$_3$)(OCH$_3$)$_2$); 27.6 (NH—CH$_2$—Si(CH$_3$)(OCH$_2$CH$_3$)(OCH$_3$)); 50.4 (—Si(CH$_3$)(OCH$_3$)$_2$); 50.6 (—Si(CH$_3$)(OCH$_2$CH$_3$)(OCH$_3$)); 58.6 (—Si(CH$_3$)(OCH$_2$CH$_3$)(OCH$_3$))

A mixture of dimethoxysilyl and methoxyethoxysilyl end groups is present (ratio 1:1)

Example 2

450 g (24 mmol) of polypropylene glycol 18000 (hydroxyl number=6.1) are dried under reduced pressure at 80° C. in a 1000 ml three-neck flask. Under a nitrogen atmosphere and at 80° C., 0.1 g of titanium tetraisopropylate is added and then, after three minutes of stirring, 90 g of tetraethoxysilane are added, and the mixture is stirred for a further 20 minutes. 0.1 g of dibutyltin dilaurate is added and then 9.1 g (54 mmol) of isocyanatomethyldimethoxymethylsilane (isocyanate content=25% by weight) are added. After stirring at 80° C. for one hour, volatile constituents (low molecular mass silanes) are distilled off under reduced pressure and the polymer formed is cooled. The product is stored in a moisture-tight glass vessel under a nitrogen atmosphere.

$^{13}$C NMR (CDCl$_3$/TMS): δ=−6.2 (—Si(CH$_3$)(OCH$_3$)$_2$); −5.7 (—Si(CH$_3$)(OCH$_2$CH$_3$)(OCH$_3$)); −5.3 (—Si(CH$_3$)(OCH$_2$CH$_3$)$_2$); 27.2 (NH—CH$_2$—Si(CH$_3$)(OCH$_3$)$_2$); 27.6 (NH—CH$_2$—Si(CH$_3$)(OCH$_2$CH$_3$)(OCH$_3$)); 27.8 (NH—CH$_2$—Si(CH$_3$)(OCH$_2$CH$_3$)$_2$); 50.4 (—Si(CH$_3$)(OCH$_3$)$_2$); 50.6 (—Si(CH$_3$)(OCH$_2$CH$_3$)(OCH$_3$)); 58.6 (—Si(CH$_3$)(OCH$_2$CH$_3$)(OCH$_3$)); 58.7 (—Si(CH$_3$)(OCH$_2$CH$_3$)$_2$))

A mixture of dimethoxysilyl, methoxyethoxysilyl, and diethoxysilyl end groups is present (ratio 1:2:0.5)

Example 3

450 g (24 mmol) of polypropylene glycol 18000 (hydroxyl number=6.1) are dried under reduced pressure at 80° C. in a 1000 ml three-neck flask. Under a nitrogen atmosphere and at 80° C., 40 g of methyltriethoxysilane are added and then, after twenty minutes of stirring, 0.2 g of titanium tetraisopropylate is added, and the mixture is stirred for a further 3 minutes. 0.1 g of dibutyltin dilaurate is added and then 9.1 g (54 mmol) of isocyanatomethyldimethoxymethylsilane (isocyanate content=25% by weight) are added. After stirring at 120° C. for two hours, volatile constituents (low molecular mass silanes) are distilled off under reduced pressure and the polymer formed is cooled. The product is stored in a moisture-tight glass vessel under a nitrogen atmosphere.

$^{13}$C NMR (CDCl$_3$/TMS): δ=−5.3 (—Si(CH$_3$)(OCH$_2$CH$_3$)$_2$); 27.8 (NH—CH$_2$—Si(CH$_3$)(OCH$_2$CH$_3$)$_2$); 58.7 (—Si(CH$_3$)(OCH$_2$CH$_3$)$_2$))

Diethoxysilyl end groups are present in a high excess. Methoxy-containing end groups are apparent only in traces in the NMR.

Comparative Example 1

450 g (24 mmol) of polypropylene glycol 18000 (hydroxyl number=6.1) are dried under reduced pressure at 80° C. in a 1000 ml three-neck flask. Under a nitrogen atmosphere and at 80° C., 0.1 g of dibutyltin laurate is added and then 9.1 g (54 mmol) of isocyanatomethyldimethoxymethylsilane (isocyanate content=25% by weight) are added. After stirring at 80° C. for one hour, the resulting polymer is cooled. The product is stored in a moisture-tight glass vessel under a nitrogen atmosphere.

$^{13}$C NMR (CDCl$_3$/TMS): δ=−6.2 (—Si(CH$_3$)(OCH$_3$)$_2$); 27.2 (NH—$\underline{C}$H$_2$—Si(CH$_3$)(OCH$_3$)$_2$); 50.4 (—Si(CH$_3$)(O$\underline{C}$H$_3$)$_2$)

Comparative Example 2

450 g (24 mmol) of polypropylene glycol 18000 (hydroxyl number=6.1) are dried under reduced pressure at 80° C. in a 1000 ml three-neck flask. Under a nitrogen atmosphere and at 80° C., 40 g of methyltriethoxysilane are added and the mixture is stirred for 20 minutes. 0.1 g of dibutyltin dilaurate is added and then 9.1 g (54 mmol) of isocyanatomethyldimethoxymethylsilane (isocyanate content=25% by weight) are added. After stirring at 80° C. for one hour, volatile constituents (low molecular mass silanes) are distilled off under reduced pressure and the polymer formed is cooled. The product is stored in a moisture-tight glass vessel under a nitrogen atmosphere.

$^{13}$C NMR (CDCl$_3$/TMS): δ=−7.1 (Si(CH$_3$)(OCH$_2$CH$_3$)$_3$); −6.2 (—Si(CH$_3$)(OCH$_3$)$_2$); 27.2 (NH—$\underline{C}$H$_2$—Si(CH$_3$)(O$\underline{C}$H$_3$)$_2$); 50.4 (—Si(CH$_3$)(OC$\underline{H}$$_3$)$_2$); 58.2 ($\overline{\text{Si}}$(CH$_3$)(OCH$_2$CH$_3$)$_3$)

A mixture of the dimethoxysilyl polymers and the triethoxymethylsilane reactant is present. The desired ethoxysilyl polymer has not formed.

Formulation Example 1 for an Adhesive Comprising Polymer 1

The adhesive formulation contains 20% by weight of the polymer from Inventive Example 3, 20% by weight of plasticizer (JAYFLEX DINP, Exxon Mobil), 56% by weight of fillers (CaCO$_3$), 0.5% by weight of AMEO (aminopropyltriethoxysilane: GENIOSIL GF93; Wacker Chemie), 0.8% by weight of isooctyltriethoxysilans (Wacker Chemie), 2% by weight of α-methacryloyltriethoxysilane (GENIOSIL XL36; Wacker), and 0.1% by weight of POLYCAT DUB (1,8-diazabicyclo[5.4.0]undec-7-ene; Air Products).

The skin-over time is 30 minutes, the tack-free time is less than 12 hours, and the methanol elimination is less than 0.15% by weight.

What is claimed is:

1. A process for preparing α-ethoxysilane modified polymers of the average general formula (Ib):

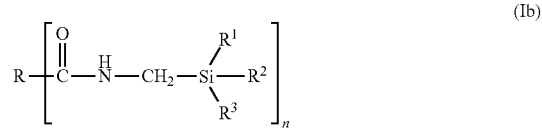

in which

R is a mono- to tetravalent polymer radical;

not more than a third of the radicals R$^1$, R$^2$, and R$^3$ present in the polymer of the formula (Ib), independently of one another, are alkyl radicals having 1 to 4 carbon atoms;

at least a quarter of the radicals R$^1$, R$^2$, and R$^3$ present in the polymer of the formula (Ib), independently of one another, are ethoxy radicals;

any remaining radicals R$^1$, R$^2$, and R$^3$ independently of one another are methoxy radicals; and n is 1 to 4;

said process comprising reacting a compound of the formula R-X$_m$, in which m is 1 to 4 and m=n and X is an isocyanate-reactive group, with at least one compound of the formula OCN—CH$_2$—SiR$^4$R$^5$R$^6$ and at least one compound of the formula SiR$^7$R$^8$R$^9$R$^{10}$ in the presence of one or more catalysts, where at least one of the radicals R$^4$, R$^5$, and R$^6$ is a methoxy radical and any further radicals R$^4$, R$^5$, and R$^6$ are alkyl radicals having 1 to 4 carbon atoms, and at least one of the radicals R$^7$, R$^8$, R$^9$ and R$^{10}$ is an ethoxy radical and any further radicals R$^7$, R$^8$, R$^9$ and R$^{10}$ are alkyl radicals having 1 to 4 carbon atoms.

2. The process as claimed in claim 1, where first the compound R-X$_m$ is introduced as an initial charge with the catalyst or catalysts and with the compound of the formula SiR$^7$R$^8$R$^9$R$^{10}$, and subsequently said initial charge is reacted with a compound of the formula OCN—CH$_2$—SiR$^4$R$^5$R$^6$ in a temperature range of 60 to 130° C.

3. The process as claimed in claim 1, where an organotitanium catalyst is used as catalyst.

4. The process as claimed in claim 3, where a titanium tetraalkoxylate is used as catalyst.

* * * * *